(12) United States Patent
Curimbaba et al.

(10) Patent No.: US 7,954,548 B2
(45) Date of Patent: Jun. 7, 2011

(54) PROPPANT FOR HYDRAULIC FRACTURING OF OIL AND GAS WELLS

(75) Inventors: Sebastião Curimbaba, Poços de Caldas (BR); Gabriel Warwick Kerr De Paiva Cortes, Minas Gerais (BR); Guilherme De Paiva Cortes, Minas Gerais (BR)

(73) Assignee: Mineracao Curimbaba Ltda. (BR)

( * ) Notice: Subject to any disclaimer, the term of this patent is extended or adjusted under 35 U.S.C. 154(b) by 562 days.

(21) Appl. No.: 10/554,690

(22) PCT Filed: Jun. 9, 2003

(86) PCT No.: PCT/BR03/00074
§ 371 (c)(1),
(2), (4) Date: Oct. 10, 2006

(87) PCT Pub. No.: WO2004/097171
PCT Pub. Date: Nov. 11, 2004

(65) Prior Publication Data
US 2007/0084602 A1 Apr. 19, 2007

(51) Int. Cl.
*C09K 8/80* (2006.01)
*E21B 43/267* (2006.01)

(52) U.S. Cl. ......... 166/280.2; 166/308.3; 428/215; 428/402; 507/269; 507/906; 507/924

(58) Field of Classification Search ......... 166/280.2; 507/906
See application file for complete search history.

(56) References Cited

U.S. PATENT DOCUMENTS

| | | | |
|---|---|---|---|
| 3,491,492 A | 1/1970 | Ueltz | |
| 3,776,340 A | 12/1973 | Moser | |
| 4,068,718 A | 1/1978 | Cooke, Jr. et al. | |
| 4,269,509 A | 5/1981 | Berry et al. | |
| 4,337,501 A | 6/1982 | Mund et al. | |
| 4,427,068 A | 1/1984 | Fitzgibbon | |
| 4,440,866 A | 4/1984 | Lunghofer et al. | |
| 4,443,347 A | 4/1984 | Underdown et al. | |
| 4,522,731 A | 6/1985 | Lunghofer | |
| 4,522,735 A | 6/1985 | Chasar | |
| 4,555,493 A | 11/1985 | Watson et al. | |
| 4,623,630 A | 11/1986 | Fitzgibbon | |
| 4,639,427 A | 1/1987 | Khaund | |
| 4,644,819 A | 2/1987 | Zugel | |
| 4,658,899 A | 4/1987 | Fitzgibbon | |
| 4,688,645 A | 8/1987 | Müller | |
| 4,713,203 A | 12/1987 | Andrews | |
| 4,717,594 A | 1/1988 | Graham et al. | |
| 4,746,468 A | 5/1988 | Ozaki et al. | |
| 4,879,181 A | 11/1989 | Fitzgibbon | |
| 4,894,285 A | 1/1990 | Fitzgibbon | |
| 4,921,820 A | 5/1990 | Rumpf et al. | |
| 4,921,821 A | 5/1990 | Rumpf et al. | |
| 4,944,905 A | 7/1990 | Gibb et al. | |
| 4,977,116 A | 12/1990 | Rumpf et al. | |
| 5,120,455 A | 6/1992 | Lunghofer | |
| 5,171,133 A | 12/1992 | Thomas | |
| 5,188,175 A | 2/1993 | Sweet | |
| 5,325,921 A | 7/1994 | Johnson et al. | |
| 5,381,864 A * | 1/1995 | Nguyen et al. | ............. 166/280.1 |
| 5,464,459 A | 11/1995 | VanBuskirk et al. | |
| 5,908,073 A | 6/1999 | Nguyen et al. | |
| 5,924,488 A | 7/1999 | Nguyen et al. | |
| 6,059,034 A | 5/2000 | Rickards et al. | |
| 6,079,492 A | 6/2000 | Hoogteijling et al. | |
| 6,116,342 A | 9/2000 | Clark et al. | |
| 6,311,773 B1 | 11/2001 | Todd et al. | |
| 6,330,916 B1 | 12/2001 | Rickards et al. | |
| 6,528,157 B1 | 3/2003 | Hussain et al. | |
| 2002/0058581 A1 | 5/2002 | Youngman et al. | |
| 2004/0187392 A1* | 9/2004 | Krause et al. | ................... 51/308 |

FOREIGN PATENT DOCUMENTS

| | | |
|---|---|---|
| BR | 9700995 | 12/1998 |
| EP | 0083974 | 7/1983 |
| EP | 0112350 | 7/1984 |
| EP | 0116369 | 8/1984 |
| GB | 2037727 | 7/1980 |
| GB | 2359316 | 8/2001 |

OTHER PUBLICATIONS

International Search Report for PCT/Br2003/000074 completed Jan. 29, 2004.

\* cited by examiner

*Primary Examiner* — George Suchfield
(74) *Attorney, Agent, or Firm* — Alston & Bird LLP

(57) ABSTRACT

The present invention relates to a proppant for the hydraulic fracturing of oil or gas wells, which consists of a mixture of from 10 to 95% by weight of a spherical proppant and from 5 to 90% by weight of an angular material, the percentages being based on the total weight of the mixture. The proppant obtained according to the present invention is useful for eliminating or decreasing the "flow-back" phenomenon in operations in oil or gas wells.

9 Claims, No Drawings

PROPPANT FOR HYDRAULIC FRACTURING OF OIL AND GAS WELLS

FIELD OF THE INVENTION

The present invention relates to an improved proppant for use in hydraulic fracturing of oil and gas wells which allows the elimination or at least considerably reduces the effect known as "flow-back".

BACKGROUND OF THE INVENTION

The oil wells are formed by oil or gas deposits, solid residues and water, enclosed in rocky or sandy formations. These well bores may have different depth levels, varying from superficial to shallow, middle or deep. Once the well has been drilled and depending upon the permeability of the medium, the extraction of the oil or the gas that comes out of the perforation is initiated through natural or artificial fractures in the rock until it reaches the surface, generally through metallic tubing. As a function of the permeability of the medium, the flow of oil or gas may be very small requiring artificial fracturing measures in order to increase it. Therefore, once the drilling phase has been completed it is possible to initiate the extraction of gas or oil, or else to employ fracturing techniques using proppants to initiate the extraction.

Also, as time goes by the continuous passage of oil or gas through the natural or artificial fractures begins to drag solid residues which gradually fills them, finally clogging or reducing the spaces within the rock, thus decreasing the oil or gas flow with the consequent reduction of productivity of the well. This leads to such critical situations that it becomes necessary to interrupt the operation of the oil well due to the lack of operation economy.

Several techniques have been developed with the purpose of improving the productivity of recently drilled wells, or of rehabilitating wells that already have clogged passages, or even of improving the productivity of wells still under operation. Those techniques which are called hydraulic fracturing consist of injecting fluids enriched with high-resistance solid agents into the existing oil wells or wells being drilled. This causes the formation of fresh fractures in the rocks that are filled up with said solid agents, thus preventing the fractures from being clogged by the external pressures exerted at the time when the pressure used in the fracturing process is ceased. Once the new fractures are opened and filled up, the oil or gas flows more easily, passing through the fractures filled with solid agents.

Such solid agents called proppants must have sufficient mechanical strength to resist to the pressures exerted on the fracture without breaking, must be resistant to the high temperatures found in the medium where they will be used, must be as spherical in shape as possible and they must also have very adjusted granulometric sizes in order to guarantee as much permeability and conductivity of the filled-up fracture medium as possible. In addition, since their use environment comprises several corrosive agents, the proppant must also be resistant to corrosion.

Various solid materials are already conventionally used as proppants, such as: sands, resinated sands, steel shot, glass spheres, in addition to different kinds of synthetic ceramic materials. Each of those proppants has advantages and disadvantages and has been used in numberless wells throughout the world.

A number of patent documents refer to these materials and manufacture processes and use of ceramic proppants, among which the following are pointed out: BR 8903886, BR 9501449-7, BR 9501450-0, BR 9502864, BR 9700995, U.S. Pat. No. 3,491,492, U.S. Pat. No. 4,068,718, U.S. Pat. No. 4,440,866, U.S. Pat. No. 4,427,068, U.S. Pat. No. 4,443,347, U.S. Pat. No. 4,522,731, U.S. Pat. No. 4,522,735, U.S. Pat. No. 4,555,493, U.S. Pat. No. 5,464,459, U.S. Pat. No. 4,623,630, U.S. Pat. No. 4,639,427, U.S. Pat. No. 4,644,819, U.S. Pat. No. 4,658,899, U.S. Pat. No. 4,688,645, U.S. Pat. No. 4,713,203, U.S. Pat. No. 4,717,594, U.S. Pat. No. 4,746,468, U.S. Pat. No. 4,879,181, U.S. Pat. No. 4,894,285, U.S. Pat. No. 4,921,820, U.S. Pat. No. 4,921,821, U.S. Pat. No. 4,944,905, U.S. Pat. No. 4,977,116, U.S. Pat. No. 5,171,133, U.S. Pat. No. 5,188,175, U.S. Pat. No. 5,120,455, U.S. Pat. No. 5,325,921, JP 5784731, EP 0083974, EP 0112350, EP 0116369, WO94/09454, DE 2921226, DE 29218584, DE 3617340, GB 2037727, FR 2090561, FR 2437689, and others.

However, none of the above documents relates to ceramic proppants developed for the purpose of reducing or even eliminating the "flow-back" process.

For the purpose of this patent application it is important to define that the term "flow-back" should be understood as the loss of the proppant applied in the fracturing immediately after cleaning the well to begin its operation, or even as the proppant that leaves the well together with the gas or oil throughout the production process. This phenomenon is known since long ago but it has only recently drawn the attention of the fracturing process users. This loss of proppant material placed in the fracture may cause environmental problems and even significant cost problems involved with the loss of all the proppant placed in the fracture. The "flow-back" effect is a long-term process, with volumes that cause serious operational problems and that is difficult to predict.

The main factors that cause loss of proppant due to the "flow-back" may be connected to:
i) low closure pressure of the fracture;
ii) work environment with a high pH maintained for a long time;
iii) action of excessive forces acting in parallel to the axis of the proppant package;
iv) incorrect choice of the proppant;
v) false economy, that it to say, the use of proppants that have more economical unit cost but are not suitable for the desired operation;
vi) fracturing design below the desired optimum.

Ceramic proppants are particularly useful for low-pressure wells due to the high permeability that is achieved with this kind of proppants. The fact they present almost perfect sphericity is a very important factor in obtaining high-permeability fractures. On the other hand, such ceramic proppants favor situations of loss of material due to "flow-back" exactly because they present this high sphericity. Low-pressure wells (shallow wells) associated to highly spherical proppants and a very rapid cleaning of the well before an efficient stabilization is achieved lead to the trend of a destabilization of the column with the transportation of the proppant to the surface.

Prevention of production by "flow-back" requires a proppant packing capable of resisting to the modifications of forces induced during normal productions. Simultaneously, the ceramic package should be capable of resisting to compression and rearrangement of the forces induced by intermittent cyclic productions.

The solutions known from the prior art for decreasing, preventing or even eliminating the "flow-back" effect comprise the use of resinated proppants, wherein the resins maintain the grains together, thus imparting difficulty for them to flow out of the fractures.

As examples of patent documents wherein resinated proppants are already disclosed for use in decreasing the flowback effect, the following may be cited: U.S. Pat. No. 6,528,157, U.S. Pat. No. 6,311,773, U.S. Pat. No. 6,116,342, U.S. Pat. No. 6,079,492, U.S. Pat. No. 5,924,488, U.S. Pat. No. 5,908,073, among others.

It is important to address to the difference of the "flow-back" when non-resinated proppants are used, wherein the undesirable effect almost always occurs due to the structural instability of the proppant itself, from the "flow-back" of resinated proppants, wherein it occurs due to design problems of the fracture or for any other reason.

Lately, the use of resinated proppants for any type of well and fracture has been indiscriminately recommended. However, although the resins contribute for eliminating or decreasing the "flow-back", they decrease the fracture permeability, consequently decreasing the productivity of the well, in addition coupled to their low resistance to high temperatures and lower crushing strength by the action of closure pressure.

Serious problems have also been observed in using these types of resinated proppants related to the total loss of the proppant that remains on the walls of the fracture due to a separation the resin from the substrate.

Other documents from the prior art relate to ceramic proppants associated to metals such as document GB 2,359,316 which teaches a composition comprising a mixture of proppant and a deformable material, for example, aluminum.

The objective of the present invention is to provide a proppant composition that may be used in an effective way for decreasing or even eliminating the "flow-back" effect without the drawbacks of the proppants already known from the prior art for this purpose.

SUMMARY OF THE INVENTION

The present invention relates to a proppant for hydraulic fracturing of oil or gas wells which consists of a mixture of from 10 to 95%, by weight, of a spherical proppant and from 5 to 90%, by weight of an angular material, the percentages being based on the total weight of the mixture.

The present invention further relates to a method for eliminating or decreasing the "flow-back" in oil or gas wells operations in which a ceramic proppant is used as the hydraulic-fracturing proppant, said ceramic proppant consisting of a mixture of from 10 to 95%, by weight, of a spherical ceramic proppant and from 5 to 90% by weight of an angular ceramic material, the percentages being based on the total weight of the mixture.

DETAILED DESCRIPTION OF THE INVENTION

The inventors have found that a mixture of specific proportions of spherical and angular ceramic materials, the latter also called "abrasives", produces a proppant composition that brings about an improved efficiency in decreasing the "flow-back" effect without the need to include resins or any other additives.

Therefore, the invention relates to a proppant for hydraulically fracturing oil and gas wells obtained by mixing spherical proppants with high-strength angular "abrasive" agents, with a view to achieve a proppant having unique fracturing characteristics.

As already mentioned above, the drawbacks of the "flow-back" process are controlled today by adding resinated natural or ceramic proppants, which are more expensive and have decreased conductivity properties. Since the proppant of the present invention does not contain resins, employing only spherical and angular ceramic materials, it does not have the drawbacks of the resinated material and is less expensive.

The term "spherical" material should be understood to define those materials that have sphericity or roundness close to perfect limits or very close to the value of 0.9×0.9, when compared with the Krumbein and Sloss Table. "Sphericity" is the measure of the trend of the particles or grains of the proppant to come close to a spherical shape, and the traditional method adopted therefore uses a visual comparing device developed by Krumbein and Loss (Stratigraphy and Sedimentation, $2^{nd}$ ed., 1955, W.H. Freeman & Co., San Francisco, Calif., USA"). This visual comparing device contains representation of different shapes of grains and is used in visually determining the sphericity. In this method, 20 particles to be examined are randomly separated and examined with the aid of a microscope, their shape being evaluated by means of the visual comparing device. The values adopted in this comparing device ranges from 0.3 to 0.9. The sphericity of each gain is determined and the average of the obtained sphericities is taken as the proppant. Sphericity.

For the purposes of this patent application, "spherical" materials are those that present an average of 0.9×0.9 when compared by the Krumbein and Sloss scale, whereas the materials defined as "angular" are those that present sphericity and roundness lower than 0.8×0.8 according to the same scale. The smaller the values obtained, the more angular is the material.

On the other hand, "roundness" is the measure of relative angularity of the edges or the curvatures of the particles or grains. The determination of roundness is made with the same particles used in determining sphericity and by using the same Krumbein and Sloss comparing device. The roundness of each of 20 randomly selected particles is evaluated and the roundness of the whole sample is taken as the arithmetic mean of the results achieved, that it so say, having a measure of 0.9×0.9 when compared by the Krumbein and Sloss scale.

Preferably, the proppant composition of the invention consists of 90% by weight of the spherical proppant and 10% by weight of the angular material, more preferably 80% by weight of the spherical proppant and 20% by weight of the angular material, still more preferably 70% by weight of the spherical proppant and 30% by weight of the angular material, all the percentages being based on the total weight of the mixture.

Several assays are used for characterizing a proppant. Most of them are defined and recommended in the "Recommended Practices for Testing High Strength Proppants Used in Hydraulic Fracturing Operations, API Recommended Practice 60 (RP-60), American Petroleum Institute, Washington, D.C., USA", including sphericity and roundness, already mentioned above.

Another characteristic considered for materials useful in the present invention and also recommended by the above cited normative publication is the crushing strength since the tests for conductivity and permeability are subjected to increasing closure pressures and the higher the crushing strength, the higher the conductivity and permeability for these materials. Conductivity and permeability are keywords in the selection of a proppant, because the fracturing process aims at an increase in productivity of the well by virtue of an increase in the conductivity and permeability by using the proppant.

The crushing-strength test measures the resistance of the proppant to crushing by action of the force applied to this proppant. In this test, the maximum pressure that leads to a sample of proppant to present an excessive generation of fines is determined. The most usually employed pressures range from 146 to 1125 Kgf/cm$^2$ (2000 to 15000 psi). The maximum amounts of fines allowed for the defined pressure vary with the granulometry of the proppant, as shown in Table 1 below.

TABLE 1

Values Indicative of Crushing Strength (API Specification for ceramic proppants)

| Granulometric Fraction of the Propannt | Maximum (%) of Fines Allowed |
|---|---|
| 12/20 | 25 |
| 16/20 | 25 |
| 20/40 | 10 |
| 40/70 | 3 |

The test for conductivity and permeability of the proppant is one of the most important to be considered. The higher the conductivity and the higher the permeability of the medium created by the proppant, the higher the well productivity. The measure of conductivity and of permeability is carried out by placing determined amounts of proppant in a cell under a determined closure pressure and for a certain period of time. A fluid is caused to pass through the proppant layers at defined and constant flow rates, temperatures and pressures. The closure pressures and layers are slowly and simultaneously increased up to defined pressures, such as for example, 140 Kgf/cm$^2$ and 422 Kgf/cm$^2$ (2000 psi and 6000 psi), respectively, and they may end, for instance, with an initial closing pressure of 844 Kgf/cm$^2$ (12000 psi). The fracture conductivity is then measured.

While measuring the conductivity, the closing pressure and the temperature are kept constant, while the stream of fluid and the differential pressure are recorded. During the whole test the proppant layers remains at a constant fracture pressure, such as, 422 Kgf/cm (6000 psi), at a constant temperature of 121° C. (250° F.). The fracture conductivity is generally measured at intervals of 10 hours. The closure pressure is increased from 140 Kgf/cm$^2$ (2000 psi) every 50 hours until the pressure of about 844 kgf/cm$^2$ (12000 psi), is reached.

Table 2 below illustrates the results obtained in the evaluation of the permeability and conductivity of a 20/40 proppant in a layer of 9.7 Kgf/m$^2$ (2.0 lb/ft2).

TABLE 2

Long-term Conductivity and permeability
SINTERLITE BAUXITE PROPPANT 20/40 @ 2.0 lb/ft2
"Between Ohio Sandstone core" (0.1 md.)
API-RP60

| Hours at closure & temperature | Closure Kgf/cm$^2$ (psi) | Temp ° C. (° F.) | Conductivity md-ft | Width mm (in) | Permeability Darcy |
|---|---|---|---|---|---|
| −14 | 70 (1000) | 19 (67) | 11874 | 5.26 (0.207) | 688 |
| −2 | 70 (1000) | 121 (250) | 10035 | 5.18 (0.204) | 590 |
| 0 | 141 (2000) | 121 (250) | 9387 | 5.13 (0.202) | 558 |
| 10 | 141 (2000) | 121 (250) | 8872 | 5.10 (0.201) | 530 |
| 20 | 141 (2000) | 121 (250) | 8723 | 5.08 (0.200) | 523 |
| 30 | 141 (2000) | 121 (250) | 8636 | 5.08 (0.200) | 518 |
| 40 | 141 (2000) | 121 (250) | 8576 | 5.08 (0.200) | 515 |
| 50 | 141 (2000) | 121 (250) | 8529 | 5.08 (0.200) | 512 |
| 0 | 281 (4000) | 121 (250) | 6728 | 4.98 (0.196) | 412 |
| 10 | 281 (4000) | 121 (250) | 6480 | 4.96 (0.195) | 399 |
| 20 | 281 (4000) | 121 (250) | 6407 | 4.93 (0.194) | 396 |
| 30 | 281 (4000) | 121 (250) | 6365 | 4.93 (0.194) | 394 |
| 40 | 281 (4000) | 121 (250) | 6335 | 4.93 (0.194) | 392 |
| 50 | 281 (4000) | 121 (250) | 6312 | 4.93 (0.194) | 390 |
| 0 | 422 (6000) | 121 (250) | 5233 | 4.83 (0.190) | 331 |
| 10 | 422 (6000) | 121 (250) | 4808 | 4.78 (0.188) | 307 |
| 20 | 422 (6000) | 121 (250) | 4687 | 4.75 (0.187) | 301 |
| 30 | 422 (6000) | 121 (250) | 4617 | 4.72 (0.186) | 298 |
| 40 | 422 (6000) | 121 (250) | 4569 | 4.72 (0.186) | 295 |
| 50 | 422 (6000) | 121 (250) | 4531 | 4.72 (0.186) | 292 |
| 0 | 562 (8000) | 121 (250) | 3356 | 4.65 (0.183) | 220 |
| 10 | 562 (8000) | 121 (250) | 2964 | 4.57 (0.180) | 197 |
| 20 | 562 (8000) | 121 (250) | 2856 | 4.57 (0.180) | 190 |
| 30 | 562 (8000) | 121 (250) | 2794 | 4.55 (0.179) | 187 |
| 40 | 562 (8000) | 121 (250) | 2751 | 4.55 (0.179) | 184 |
| 50 | 562 (8000) | 121 (250) | 2718 | 4.55 (0.179) | 182 |
| 0 | 703 (10000) | 121 (250) | 2150 | 4.47 (0.176) | 147 |
| 10 | 703 (10000) | 121 (250) | 1903 | 4.42 (0.174) | 131 |
| 20 | 703 (10000) | 121 (250) | 1835 | 4.37 (0.172) | 128 |
| 30 | 703 (10000) | 121 (250) | 1796 | 4.34 (0.171) | 126 |
| 40 | 703 (10000) | 121 (250) | 1769 | 4.34 (0.171) | 124 |
| 50 | 703 (10000) | 121 (250) | 1748 | 4.34 (0.171) | 123 |
| 0 | 844 (12000) | 121 (250) | 1379 | 4.27 (0.168) | 99 |
| 10 | 844 (12000) | 121 (250) | 1214 | 4.22 (0.166) | 88 |
| 20 | 844 (12000) | 121 (250) | 1168 | 4.19 (0.165) | 85 |
| 30 | 844 (12000) | 121 (250) | 1142 | 4.17 (0.164) | 84 |
| 40 | 844 (12000) | 121 (250) | 1124 | 4.17 (0.164) | 82 |
| 50 | 844 (12000) | 121 (250) | 1110 | 4.17 (0.164) | 81 |

Considering all the above-mentioned characteristics, the preferred materials for use in the present invention may be selected from the following raw materials:

Spherical Material:

They may be proppants for hydraulic fracturing available in the international market with various commercial names, such as SinterBall Bauxite, SinterLite Bauxite, those two being produced by the present applicant Mineração Curimbaba Ltda. (Curimbaba mining company), with its head office in Poços de Caldas, MG, Brazil; Carbo HSP, CarboProp, CarboLite, Econoprop, those four being produced by Carbo Ceramics, with its head office in Dallas, Tex., USA; Sintered Bauxite, Naplite, Valuprop, those three being produced by Saint-Gobain Materiais Cerâmicos, ex Norton Alcoa, with its head office in the USA; Borovich, produced in Russia, among others. What characterizes those proppant is mainly the fact that they are synthetic products obtained from the most varied raw materials, which are ground, pelletized and sintered at high temperatures, with sphericity and roundness of about 0.9×0.9 when measured by the Krumbein and Sloss scale.

Preferably, the spherical proppant used in the present invention is SinterLite Bauxite, a spherical ceramic proppant used in hydraulic fracturing and produced by Mineração Curimbaba Ltda. from bauxite ores in Poços de Caldas, MG, Brazil. The choice of this material as the spherical ceramic proppant is not limitative of the invention since it is possible to use any materials for the same purpose, either ceramic or not, synthetic or not, as for example, SinterBall Bauxite, also manufactured by Mineração Curimbaba and described in Brazilian Patent Application PI 9501449-7.

The most preferred spherical proppant for the present invention is SinterLite Bauxite which presents the following main chemical and physical characteristics illustrated in Tables 3 and 4, non-restrictive of the present patent application.

Angular Abrasive Material:

This is a product obtained by sintering the most different raw materials at high temperatures and that are ground after the sintering process so as to provide angular particles always with sphericity and roundness below approximately 0.8×0.8 when measured by the Krumbein and Sloss scale.

A preferred material for use in the invention as the angular abrasive is a ceramic material. However, the fact that it is ceramic does not restrict the applicability of this patent application, since any product, either natural or synthetic, will meet the requirements of this patent application provided that it is angular. Among the angular abrasive materials which can be mentioned, is quartz, sands, broken-stone, ceramic oxides of any composition such as zirconia mulite, spinelle, and others and/or mixtures thereof; non-oxides such as silicon carbide, silicon nitride, silicon oxinitride, babassu bark, etc. This means that any natural or synthetic material may be considered suitable for the process. What limits its applicability is its mechanical strength. Basically, the higher the mechanical strength and the lower the density, the more suitable it will be for the process.

Preferably, this abrasive material is the one described in the Brazilian patent application PI 9700995-4 and commercialized by Mineração Curimbaba with the trade name Sinter-Blast. It is comprised by homogeneous, sintered angular abrasive bauxite particles and presents high density, high strength, high abrasivity, high hardness and high toughness. Up to this moment it is usually employed for finishing and cleaning surfaces in compressed-air jetting operations. This product further exhibits high rugosity, which has been found by the inventors to be an advantage for its use in the composition of the invention since it contributes for reducing the "flow-back". The chemical and physical characteristics of the above-mentioned angular abrasive SinterBlast are indicated in Tables 5 and 6.

TABLE 3

Chemical Composition of the Sinterlite Bauxite Proppant

| Oxide | Contents (%) |
|---|---|
| $Al_2O_3$ | 72.8 |
| $Fe_2O_3$ | 12.5 |
| $SiO_2$ | 13.0 |
| $TiO_2$ | 1.47 |
| CaO + MgO | 0.09 |
| $K_2O + Na_2O$ | 0.04 |
| Mineralogical composition | Corundum Mulite Hematite |
| Solubility in HCl + HF, % | <6 |

TABLE 4

Physical characteristics of the Sinterlite Bauxite Proppant

| Apparent density g/cm³ | 3.18 |
|---|---|
| Loose apparent density: | |
| 16/30, g/cm³ | 1.74 |
| 20/40, g/cm³ | 1.75 |
| Compression strength: | |
| 20/40 @ 7500 psi (%) | 3.2 |
| 16/30 @ 7500 psi (%) | 8.8 |
| Sphericity × Roundness | 0.9 × 0.9 |

TABLE 5

Characteristics of the SinterBlast Abrasive Product

| Oxide | Contents (%) |
|---|---|
| $Al_2O_3$ | 79.3 |
| $Fe_2O_3$ | 14.5 |
| $SiO_2$ | 3.65 |
| $TiO_2$ | 1.87 |
| Cao + MgO | 1.06 |
| $K_2O + Na_2O$ | 0.83 |
| Free silica | No contents |
| Mineralogical composition | Corundum Mulite hematite |

TABLE 6

Physical Characteristics of the SinterBlast Abrasive Product

| Apparent specific mass g/cm3 | |
|---|---|
| Loose apparent density: | 3.76 |
| 12/20, g/cm³ | 1.93 |
| 20/40, g/cm³ | 2.00 |
| 40/70, g/cm³ | 1.87 |
| 70/120, g/cm³ | 1.72 |
| Compression strength: | |
| 12/20 - 546 Kgf/com² (% fines) | 19.2 |
| 20/40 - 548 Kgf/cm² (5 fines) | 8.2 |
| 40/70 - 548 Kgf/cm² (% fines) | 15.0 |

TABLE 6-continued

Physical Characteristics of the SinterBlast Abrasive Product

Apparent specific mass g/cm3

| Granulometry - range 12/20: | |
|---|---|
| Retained mesh 8 (%) | 00.0 |
| Retained mesh 12 + 16 + 18 + 20 (%) | 99.7 |
| Passing through mesh 30 (%) | 0.30 |
| Granulometry - range 20/40: | |
| Retained mesh 16 (%) | 0.94 |
| Retained mesh 20 + 30 + 40 (%) | 98.7 |
| Passing through mesh 50 (%) | 0.45 |
| Granulometry - range 40/70: | |
| Retained mesh 30 (5) | 0.13 |
| Retained mesh 40 + 60 + 70 (%) | 97.7 |
| Passing through mesh 100 (%) | 1.09 |
| Granulometry - range 70/120: | |
| Retained mesh 50 (%) | 0.2 |
| Retained mesh 70 + 80 + 120 (%) | 98.9 |
| Passing through mesh 50 (%) | 0.88 |

The process of manufacturing the proppant of the present invention consists in physically mixing the two components, the spherical material and the angular material, in specific proportions. The parameters and equipment to be used in the mixing process are those conventionally used for analogous mixtures, being promptly identified and understood by any person skilled in the art.

The illustrative examples presented below will serve to describe the present invention in a better way. However, the illustrated data and procedures merely refers to some embodiments of the present invention and should not be considered limitative of the scope of the invention.

Example 1

Various mixtures were prepared in accordance with the invention by using the following raw materials:

1—spherical material: SinterLite Bauxite, granulometric fraction 20/40

2—angular material: SinterBlast, granulometric fraction 20/40

The mixtures thus prepared contained the following proportions:

a) 100% SinterLite Bauxite 20/40, identified as 100 SL (control)

b) 90% SinterLite Bauxite 20/40+10%. SinterBlast 20/40, identified as: 90SL+10SB c) 80% SinterLite Bauxite 20/40+20% SinterBlast 20/40, identified as: 80SL+20SB d) 70% SinterLite Bauxite 20/40+30% SinterBlast 20/40, identified as: 70SL+30SB The resulting mixtures present the characteristics indicated in Table 7:

TABLE 7

Physical Characteristics

| Product | AD | LD | Abs. D | CR | Sol |
|---|---|---|---|---|---|
| 100SL | 3.25 | 1.91 | 3.44 | 2.39 | 4.22 |
| 90SL + 10SB | 3.30 | 1.91 | 3.47 | 3.36 | 4.83 |
| 80SL + 20SB | 3.34 | 1.92 | 3.51 | 3.60 | 5.48 |
| 70SL + 30SB | 3.35 | 1.93 | 3.52 | 3.75 | 5.58 |

AD = apparent density, g/cm$^3$
LD = loose density, g/cm$^3$
Abs. D = absolute density, g/cm$^3$
CR = crushing strength, % fines generated
Sol = solubility %

The proppant compositions thus obtained were subjected to conductivity and permeability tests r, the results of which are presented in the following tables.

TABLE 8

Conductivity and permeability of the 100SL material (control)

| Hours at closure & temperature | Closure Kgf/cm$^2$ (psi) | Temp ° C. (° F.) | Conductivity md-ft | Width mm (in) | Permeability Darcy |
|---|---|---|---|---|---|
| −14 | 70 (1000) | 19 (67) | 8676 | 5.05 (0.199) | 523 |
| −2 | 70 (1000) | 121 (250) ((250) (250) | 6580 | 5.03 (0.198) | 399 |
| 0 | 141 (2000) | 121 (250) | 6192 | 5.00 (0.197) | 377 |
| 10 | 141 (2000) | 121 (250) | 5979 | 4.98 (0.196) | 366 |
| 20 | 141 (2000) | 121 (250) | 5916 | 4.93 (0.194) | 366 |
| 30 | 141 (2000) | 121 (250) | 5880 | 4.95 (0.195) | 362 |
| 40 | 141 (2000) | 121 (250) | 5854 | 4.95 (0.195) | 360 |
| 50 | 141 (2000) | 121 (250) | 5834 | 4.95 (0.195) | 359 |
| 0 | 281 (4000) | 121 (250) | 5055 | 4.80 (0.189) | 321 |
| 10 | 281 (4000) | 121 (250) | 4843 | 4.78 (0.188) | 309 |
| 20 | 281 (4000) | 121 (250) | 4781 | 4.78 (0.188) | 305 |
| 30 | 281 (4000) | 121 (250) | 4745 | 4.75 (0.187) | 305 |
| 40 | 281 (4000) | 121 (250) | 4719 | 4.75 (0.187) | 303 |
| 50 | 281 (4000) | 121 (250) | 4700 | 4.75 (0.187) | 302 |
| 0 | 422 (6000) | 121 (250) | 3761 | 4.55 (0.179) | 252 |
| 10 | 422 (6000) | 121 (250) | 3534 | 4.55 (0.179) | 237 |
| 20 | 422 (6000) | 121 (250) | 3468 | 4.55 (0.181) | 230 |
| 30 | 422 (6000) | 121 (250) | 3430 | 4.55 (0.179) | 234 |
| 40 | 422 (6000) | 121 (250) | 3403 | 4.55 (0.179) | 228 |
| 50 | 422 (6000) | 121 (250) | 3383 | 4.42 (0.174) | 233 |
| 0 | 562 (8000) | 121 (250) | 2643 | 4.34 (0.171) | 186 |
| 10 | 562 (8000) | 121 (250) | 2310 | 4.34 (0.171) | 162 |
| 20 | 562 (8000) | 121 (250) | 2219 | 4.42 (0.174) | 157 |
| 30 | 562 (8000) | 121 (250) | 2167 | 4.27 (0.168) | 155 |
| 40 | 562 (8000) | 121 (250) | 2131 | 4.24 (0.167) | 153 |
| 50 | 562 (8000) | 121 (250) | 2103 | 4.27 (0.168) | 150 |

TABLE 8-continued

Conductivity and permeability of the 100SL material (control)

| Hours at closure & temperature | Closure Kgf/cm² (psi) | Temp °C. (°F.) | Conductivity md-ft | Width mm (in) | Permeability Darcy |
|---|---|---|---|---|---|
| 0 | 703 (10000) | 121 (250) | 1520 | 4.10 (0.161) | 113 |
| 10 | 703 (10000) | 121 (250) | 1298 | 4.04 (0.159) | 98 |
| 20 | 703 (10000) | 121 (250) | 1238 | 4.04 (0.159) | 93 |
| 30 | 703 (10000) | 121 (250) | 1204 | 4.01 (0.158) | 91 |
| 40 | 703 (10000) | 121 (250) | 1180 | 3.99 (0.157) | 90 |
| 50 | 703 (10000) | 121 (250) | 1162 | 3.96 (0.156) | 89 |

TABLE 9

Conductivity and Permeability of the material 90SL + 10SB

| Hours at closure & temperature | Closure kgf/cm2 (psi) | Temp °C. (°F.) | Conductivity md-ft | Width mm (in) | Permeability (Darcy) |
|---|---|---|---|---|---|
| −14 | 70 (1000) | 26 (78) | 10084 | 5.38 (0.213) | 568 |
| −2 | 70 (1000) | 121 (250) | 7392 | 5.30 (0.212) | 418 |
| 0 | 141 (2000) | 121 (250) | 6792 | 5.21 (0.205) | 398 |
| 10 | 141 (2000) | 121 (250) | 6540 | 5.17 (0.203) | 387 |
| 20 | 141 (2000) | 121 (250) | 6466 | 5.17 (0.203) | 382 |
| 30 | 141 (2000) | 121 (250) | 6424 | 5.17 (0.203) | 380 |
| 40 | 141 (2000) | 121 (250) | 6393 | 5.17 (0.203) | 378 |
| 50 | 141 (2000) | 121 (250) | 6370 | 5.13 (0.202) | 378 |
| 0 | 281 (4000) | 121 (250) | 5121 | 4.88 (0.192) | 320 |
| 10 | 281 (4000) | 121 (250) | 4976 | 4.85 (0.191) | 313 |
| 20 | 281 (4000) | 121 (250) | 4933 | 4.85 (0.191) | 310 |
| 30 | 281 (4000) | 121 (250) | 4908 | 4.80 (0.189) | 312 |
| 40 | 281 (4000) | 121 (250) | 4890 | 4.83 (0.190) | 309 |
| 50 | 281 (4000) | 121 (250) | 4877 | 4.80 (0.189) | 310 |
| 0 | 422 (6000) | 121 (250) | 3676 | 4.67 (0.184) | 240 |
| 10 | 422 (6000) | 121 (250) | 3354 | 4.65 (0.183) | 220 |
| 20 | 422 (6000) | 121 (250) | 3262 | 4.65 (0.183) | 214 |
| 30 | 422 (6000) | 121 (250) | 3210 | 4.60 (0.181) | 213 |
| 40 | 422 (6000) | 121 (250) | 3174 | 4.60 (0.181) | 210 |
| 50 | 422 (6000) | 121 (250) | 3146 | 4.57 (0.180) | 210 |
| 0 | 562 (8000) | 121 (250) | 2136 | 4.42 (0.174) | 147 |
| 10 | 562 (8000) | 121 (250) | 1874 | 4.39 (0.173) | 130 |
| 20 | 562 (8000) | 121 (250) | 1802 | 4.34 (0.171) | 127 |
| 30 | 562 (8000) | 121 (250) | 1761 | 4.30 (0.169) | 125 |
| 40 | 562 (8000) | 121 (250) | 1732 | 4.32 (0.170) | 122 |
| 50 | 562 (8000) | 121 (250) | 1711 | 4.32 (0.170) | 121 |
| 0 | 703 (10000) | 121 (250) | 1244 | 4.22 (0.166) | 90 |
| 10 | 703 (10000) | 121 (250) | 1070 | 4.14 (0.163) | 79 |
| 20 | 703 (10000) | 121 (250) | 1023 | 4.14 (0.163) | 75 |
| 30 | 703 (10000) | 121 (250) | 996 | 4.12 (0.162) | 74 |
| 40 | 703 (10000) | 121 (250) | 977 | 4.10 (0.161) | 73 |
| 50 | 703 (10000) | 121 (250) | 963 | 4.06 (0.160) | 72 |

TABLE 10

Conductivity and Permeability of the material 80SL + 20SB

| Hours at closure & temperature | Closure Kgf/cm2 (psi) | Temp °C. (°F.) | Conductivity md-ft | Width mm (in) | Permeability (Darcy) |
|---|---|---|---|---|---|
| −14 | 70 (1000) | 26 (78) | 8747 | 5.23 (0.206) | 510 |
| −2 | 70 (1000) | 121 (250) | 8383 | 5.28 (0.208) | 484 |
| 0 | 141 (2000) | 121 (250) | 7700 | 4.98 (0.196) | 471 |
| 10 | 141 (2000) | 121 (250) | 7591 | 4.95 (0.195) | 467 |
| 20 | 141 (2000) | 121 (250) | 7558 | 4.93 (0.194) | 468 |
| 30 | 141 (2000) | 121 (250) | 7539 | 4.95 (0.194) | 466 |
| 40 | 141 (2000) | 121 (250) | 7526 | 4.93 (0.194) | 466 |
| 50 | 141 (2000) | 121 (250) | 7515 | 4.88 (0.192) | 470 |
| 0 | 281 (4000) | 121 (250) | 6209 | 4.72 (0.186) | 401 |
| 10 | 281 (4000) | 121 (250) | 5870 | 4.70 (0.185) | 381 |
| 20 | 281 (4000) | 121 (250) | 5771 | 4.70 (0.185) | 374 |
| 30 | 281 (4000) | 121 (250) | 5715 | 4.65 (0.183) | 375 |

TABLE 10-continued

Conductivity and Permeability of the material 80SL + 20SB

| Hours at closure & temperature | Closure Kgf/cm2 (psi) | Temp °C. (°F.) | Conductivity md-ft | Width mm (in) | Permeability (Darcy) |
|---|---|---|---|---|---|
| 40 | 281 (4000) | 121 (250) | 5675 | 4.67 (0.184) | 370 |
| 50 | 281 (4000) | 121 (250) | 5644 | 4.65 (0.183) | 370 |
| 0 | 422 (6000) | 121 (250) | 4120 | 4.47 (0.176) | 281 |
| 10 | 422 (6000) | 121 (250) | 3725 | 4.39 (0.173) | 258 |
| 20 | 422 (6000) | 121 (250) | 3614 | 4.42 (0.174) | 249 |
| 30 | 422 (6000) | 121 (250) | 3550 | 4.39 (0.173) | 246 |
| 40 | 422 (6000) | 121 (250) | 3506 | 4.39 (0.173) | 243 |
| 50 | 422 (6000) | 121 (250) | 3472 | 4.39 (0.173) | 241 |
| 0 | 562 (8000) | 121 (250) | 2258 | 4.19 (0.165) | 164 |
| 10 | 562 (6000) | 121 (250) | 1900 | 4.17 (0.164) | 139 |
| 20 | 562 (8000) | 121 (250) | 1804 | 4.17 (0.164) | 132 |
| 30 | 562 (8000) | 121 (250) | 1750 | 4.14 (0.163) | 129 |
| 40 | 562 (8000) | 121 (250) | 1713 | 4.12 (0.162) | 127 |
| 50 | 562 (8000) | 121 (250) | 1684 | 4.10 (0.161) | 126 |
| 0 | 703 (10000) | 121 (250) | 1163 | 3.94 (0.155) | 90 |
| 10 | 703 (10000) | 121 (250) | 948 | 3.91 (0.154) | 74 |
| 20 | 703 (10000) | 121 (250) | 892 | 3.86 (0.152) | 70 |
| 10 | 281 (4000) | 121 (250) | 4233 | 4.62 (0.182) | 279 |
| 20 | 281 (4000) | 121 (250) | 4157 | 4.65 (0.183) | 273 |
| 30 | 281 (4000) | 121 (250) | 4113 | 4.62 (0.182) | 271 |
| 10 | 703 (10000) | 121 (250) | 1089 | 3.89 (0.153) | 85 |
| 20 | 703 (10000) | 121 (250) | 1043 | 3.86 (0.152) | 82 |
| 30 | 703 (10000) | 121 (250) | 1017 | 3.86 (0.152) | 80 |
| 40 | 703 (10000) | 121 (250) | 999 | 3.86 (0.152) | 79 |
| 50 | 703 (10000) | 121 (250) | 985 | 3.84 (0.151) | 78 |

TABLE 11

Conductivity and Permeability of the material 70SL + 30SB

| Hours at closure & temperature | Closure kgf/cm2 (psi) | Temp °C. (°F.) | Conductivity md-ft | Width mm (in) | Permeability Darcy |
|---|---|---|---|---|---|
| −14 | 70 (1000) | 19 (67) | 7895 | 4.98 (0.196) | 483 |
| −2 | 70 (1000) | 121 (250) | 6170 | 4.98 (0.196) | 378 |
| 0 | 141 (2000) | 121 (250) | 5722 | 4.93 (0.194) | 354 |
| 10 | 141 (2000) | 121 (250) | 5559 | 4.93 (0.194) | 344 |
| 20 | 141 (2000) | 121 (250) | 5511 | 4.88 (0.192) | 344 |
| 30 | 141 (2000) | 121 (250) | 5483 | 4.85 (0.191) | 345 |
| 40 | 141 (2000) | 121 (250) | 5464 | 4.85 (0.191) | 343 |
| 50 | 141 (2000) | 121 (250) | 5448 | 4.83 (0.190) | 344 |
| 0 | 281 (4000) | 121 (250) | 4495 | 4.67 (0.184) | 293 |
| 10 | 281 (4000) | 121 (250) | 4233 | 4.62 (0.182) | 279 |
| 20 | 281 (4000) | 121 (250) | 4157 | 4.65 (0.183) | 273 |
| 30 | 281 (4000) | 121 (250) | 4113 | 4.62 (0.182) | 271 |
| 40 | 281 (4000) | 121 (250) | 4082 | 4.62 (0.182) | 269 |
| 50 | 281 (4000) | 121 (250) | 4058 | 4.65 (0.183) | 266 |
| 0 | 422 (6000) | 121 (250) | 3142 | 4.39 (0.173) | 218 |
| 10 | 422 (6000) | 121 (250) | 2775 | 4.37 (0.172) | 194 |
| 20 | 422 (6000) | 121 (250) | 2673 | 4.42 (0.174) | 184 |
| 30 | 422 (6000) | 121 (250) | 2615 | 4.37 (0.172) | 182 |
| 40 | 422 (6000) | 121 (250) | 2575 | 4.42 (0.174) | 178 |
| 50 | 422 (6000) | 121 (250) | 2544 | 4.29 (0.169) | 181 |
| 0 | 562 (8000) | 121 (250) | 1891 | 4.17 (0.164) | 138 |
| 10 | 562 (8000) | 121 (250) | 1615 | 4.12 (0.162) | 120 |
| 20 | 562 (8000) | 121 (250) | 1540 | 4.13 (0.163) | 113 |
| 30 | 562 (8000) | 121 (250) | 1498 | 4.14 (0.163) | 112 |
| 40 | 562 (8000) | 121 (250) | 1469 | 4.06 (0.160) | 110 |
| 50 | 562 (8000) | 121 (250) | 1446 | 4.06 (0.160) | 109 |
| 0 | 703 (10000) | 121 (250) | 1259 | 3.94 (0.155) | 98 |

TABLE 12

Summary of the Conductivities and Permeabilities obtained

| Proppant | Closure kgf/cm2 (psi) | Conductivity md-ft | Permeability Darcy |
|---|---|---|---|
| 100SL | 141(2000) | 5834 | 359 |
|  | 281(4000) | 4700 | 302 |
|  | 422(6000) | 3383 | 233 |
|  | 562(8000) | 2103 | 150 |
|  | 703(10000) | 1162 | 88 |
| 90SL + 10SB | 141(2000) | 6379 | 378 |
|  | 281(4000) | 4877 | 310 |
|  | 422(6000) | 3146 | 210 |
|  | 562(8000) | 1711 | 121 |
|  | 703(10000) | 963 | 721 |
| 80SL + 20SB | 141(2000) | 7515 | 470 |
|  | 281(4000) | 5644 | 370 |
|  | 422(6000) | 3472 | 241 |
|  | 562(8000) | 1684 | 26 |
|  | 703(10000) | 822 | 85 |
| 70SL + 30SB | 141(2000) | 5448 | 344 |
|  | 281(4000) | 4058 | 266 |
|  | 422(6000) | 2544 | 181 |
|  | 562(8000) | 1446 | 108 |
|  | 703(10000) | 985 | 78 |

The results shown in Table 12 indicate that up to 422 Kgf/cm (6000 psi) and with addition of 20% of SinterBlast, it was surprisingly possible to improve the conductivity and the permeability of the concentrated SinterLite Bauxite 100%.

Therefore, the above data show that addition of angular particles to a spherical proppant enables the obtention of a proppant having unique characteristics of resistance to the "flow-back" and, consequently, a desired result of total elimination of "flow-back".

The invention claimed is:
1. A proppant for the hydraulic fracturing of oil or gas wells, characterized in that it consists of a mixture of 90% by weight of the spherical proppant and 10% by weight of the angular material, the percentages being based on the total weight of the mixture.

2. A proppant for the hydraulic fracturing of oil or gas wells, characterized in that it consists of a mixture of from 10 to 95% by weight of a spherical proppant and from 5 to 90% by weight of an angular material, the percentages being based on the total weight of the mixtures, and wherein the spherical proppant component consists of a ceramic proppant having the following chemical composition:

| Oxide | Contents (%) |
| --- | --- |
| $Al_2O_3$ | 72.8 |
| $Fe_2O_3$ | 12.5 |
| $SiO_2$ | 13.0 |
| $TiO_2$ | 1.47 |
| $CaO + MgO$ | 0.09 |
| $K_2O + Na_2O$ | 0.04 |
| Mineralogical composition | Corundum Mulite hermatite |
| Solubility in HCl + HF, % | <6. |

3. A proppant for the hydraulic fracturing of oil or gas wells, characterized in that it consists of a mixture of from 10 to 95% by weight of a spherical ceramic proppant and from 5 to 90% by weight of an angular ceramic material, the percentages being based on the total weight of the mixtures, and wherein the proppant is characterized by the absence of resin materials.

4. A proppant according to claim 3, characterized in that it consists of a mixture of 80% by weight of the spherical proppant and 20% by weight of the angular material, the percentages being based on the total weight of the mixture.

5. A proppant according to claim 3, characterized in that it consists of a mixture of 70% by weight of the spherical proppant and 30% by weight of the angular material, the percentages being based on the total weight of the mixtures.

6. A proppant according to claim 3, characterized in that the angular material component consists of a ceramic material having the following chemical composition:

| Oxide | Contents (%) |
| --- | --- |
| $Al_2O_3$ | 79.3 |
| $Fe_2O_3$ | 14.5 |
| $SiO_2$ | 3.65 |
| $TiO_2$ | 1.87 |
| $CaO + MgO$ | 1.06 |
| $K_2O + Na_2O$ | 0.83 |
| Free silica | No contents |
| Mineralogical composition | Corundum Mulite hermatite. |

7. A proppant according to claim 3, characterized in that it consists of a mixture of 90% by weight of the spherical proppant and 10% by weight of the angular material, the percentages being based on the total weight of the mixture.

8. A proppant according to claim 3, wherein the spherical and angular material is bauxite.

9. A method of eliminating or decreasing the flow back effect in operations of oil or gas wells, comprising the step of injecting the proppant as defined in claim 3 into a well.

* * * * *

UNITED STATES PATENT AND TRADEMARK OFFICE
CERTIFICATE OF CORRECTION

| | | |
|---|---|---|
| PATENT NO. | : 7,954,548 B2 | Page 1 of 1 |
| APPLICATION NO. | : 10/554690 | |
| DATED | : June 7, 2011 | |
| INVENTOR(S) | : Curimbaba et al. | |

It is certified that error appears in the above-identified patent and that said Letters Patent is hereby corrected as shown below:

On the Title Page,

Insert the following:

Item --(30)  Foreign Application Priority Data

April 29, 2003  (BR)..................................PI0301036-8--.

Signed and Sealed this
Fifth Day of June, 2012

David J. Kappos
*Director of the United States Patent and Trademark Office*